United States Patent [19]

Nakayama et al.

[11] Patent Number: 5,326,135

[45] Date of Patent: Jul. 5, 1994

[54] VEHICLE WHEEL SPLASH ATTENUATOR

[75] Inventors: Takeshi Nakayama; Itaru Kurimoto, both of Kanagawa; Koutaro Endo, Tokyo, all of Japan

[73] Assignee: Bridgestone Corporation, Tokyo, Japan

[21] Appl. No.: 931,230

[22] Filed: Aug. 17, 1992

[30] Foreign Application Priority Data

Aug. 19, 1991 [JP] Japan ................... 3-231016

[51] Int. Cl.$^5$ ............................ B62D 25/16
[52] U.S. Cl. ................... 280/850; 280/851
[58] Field of Search ............ 280/849, 850, 851, 852, 280/847, 848, 152.3

[56] References Cited

U.S. PATENT DOCUMENTS

| 3,899,192 | 8/1975 | Reddaway | 280/851 |
| 4,205,861 | 6/1980 | Roberts et al. | 280/851 |
| 4,372,570 | 2/1983 | Goodall | 280/851 |

FOREIGN PATENT DOCUMENTS

| 999897 | 11/1976 | Canada | 280/851 |
| 0425852 | 5/1991 | European Pat. Off. | |
| 8700133 | 8/1988 | Netherlands | 280/851 |
| 2078181 | 1/1982 | United Kingdom | 280/851 |
| 2100206 | 12/1982 | United Kingdom | 280/851 |
| 2132148 | 7/1984 | United Kingdom | 280/851 |
| 2182900 | 5/1987 | United Kingdom | 280/851 |

Primary Examiner—Brian L. Johnson
Attorney, Agent, or Firm—Jordan and Hamburg

[57] ABSTRACT

A vehicle wheel splash attenuator has a deflection-suppressing member designed to be installed in a tire housing so as to face a tire and define a space of more than 15 mm between itself and the inner face of the tire housing. The deflection-suppressing member has strands formed therein which define a plurality of apertures through which muddy water flung by the tire is passed. The deflection-suppressing member thus suppresses the deflection of the muddy water impinging upon the tire housing. The opening ratio of the apertures is within a range of 25 to 55%, the diameter of the apertures elongated circumferentially of the tire is within a range of 30 to 150 mm, and the width of those strands defining the apertures and facing the tire is within a range of 2 to 15 mm. The cross-section of at least those strands projected toward the tire is shaped into a triangle whose apex is directed toward the tire and whose bottom is directed toward the tire housing.

3 Claims, 7 Drawing Sheets

VEHICLE WHEEL SPLASH ATTENUATOR

BACKGROUND OF THE INVENTION

The present invention relates to a splash attenuator intended for use with a vehicle wheel to prevent muddy water or rain water flung from a tire from being sprayed and splashed by deflection when it impinges upon a tire housing.

Various types of splash attenuators are known. A typical one is shown in Roberts et al., U.S. Pat. No. 4,205,861.

Figure 1:
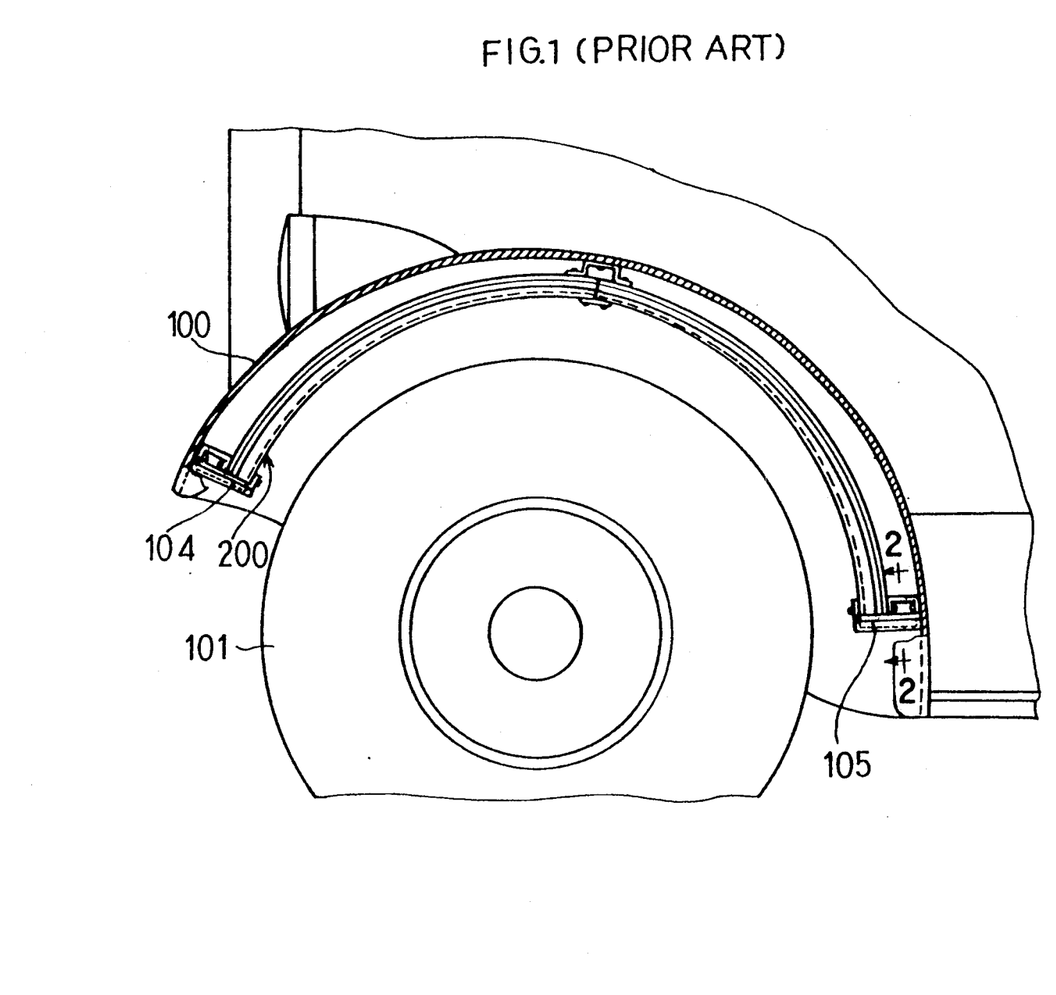
FIG. 1 is a side elevation of a conventional vehicle wheel spray collector.
Figure 2:
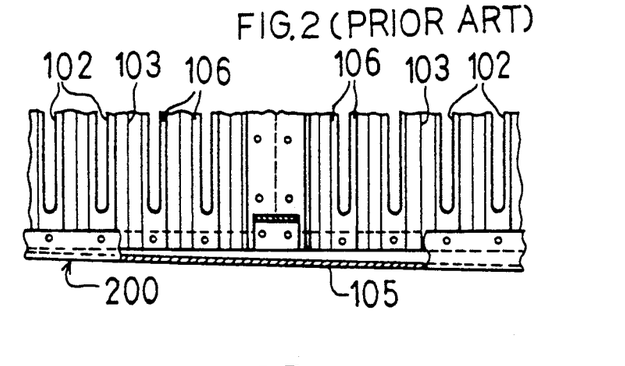
FIG. 2 is a sectional view taken along the line 2—2 in FIG. 1.

FIGS. 1 and 2 show the vehicle wheel spray collector disclosed in the Robert et al., U.S. patent. A shield 200 is provided inside a fender 100 and faces a front wheel 101. The shield 200 has formed therein a plurality of apertures 102 through which rain water or the like flung from the wheel 101 is passed. The shield 200 and fender 100 are spaced from each other. A plurality of troughs 103 is formed between adjacent apertures 102. The spray collected in troughs 103 flows into a runoff gutter 104 provided beneath the forward end of the shield. The runoff gutter 104 is inclined to dump the collected water. Also, another inclined runoff gutter 105 is provided beneath the rear end of the shield 200 to dump the collected rain water. There is provided a flange 106 at the boundary between a trough 103 and an aperture 102. The rain water collected in the trough 103 surrounded by the flange 106 cannot easily return into the aperture 102 because of the surrounding flange.

In this conventional spray collector, the ratio of the whole opening area of the troughs 103 to the total surface area of the shield 200 is small, so that rain water is also flung from the wheel 101 against other surface in addition is the troughs 103. In other words, the amount of rain water flung against the shield 200 is larger than that of the rain water passed through the shield 200, and so rain water is deflected and sprayed from the shield 200. A spray collector using such a shield 200 thus cannot satisfactorily perform its function.

SUMMARY OF THE INVENTION

Accordingly, an object of the present invention this to provide a vehicle wheel splash attenuator which prevents muddy water deflected from a tire housing from being sprayed and splashed.

The above object can be accomplished, according to the present invention, by providing a deflection-suppressing member disposed within a tire housing so as to face a tire, the deflection-suppressing member being made of strands between which there is defined a plurality of apertures through which muddy water flung from the tire passes, spacing the deflection-suppressing member and the inner face of the tire housing more than 15 mm from each other; selecting 1) within a range of 25 to 55% the ratio of the area all the apertures occupy to the whole surface area of the deflection-suppressing member facing the tire (the "opening ratio"), 2) the diameter of the apertures elongated circumferentially of the tire within a range of 30 to 150 mm and 3) the width of each of the strands facing the tire within a range of 2 to 15 mm; and shaping the cross-section of at least the strands projected toward the tire into a triangle whose apex is directed towards the tire and whose bottom is directed towards the tire housing.

When the splash attenuator is provided within a tire housing muddy water flung by a tire is passed heavily through the deflection-suppressing member and the muddy water, having the its incident energy thus attenuated, impinges upon the inner face of the tire housing from the plurality of apertures. The muddy water, having impinged upon the inner face of the tire housing, is deflected back toward the tire, but the deflection-suppressing member attenuates the deflection energy of the muddy water and thus the water is prevented from splashing. A space of 15 mm or more between the deflection-suppressing member and the inner face of the tire housing serves as a zone for absorbing the incident and deflection energies of the muddy water. Further, since the strands have a triangular cross section with the apex directed towards the tire and the bottom towards the tire housing, the majority of the muddy water flung from the tire is passed through the apertures, whereby water impinging upon the strands is prevented from being sprayed. Also, the strands can be integrally formed from a synthetic resin. Thus, the deflection-suppressing member can be manufactured at low cost, and can be easily installed to a tire housing.

DESCRIPTION OF THE PREFERRED EMBODIMENTS

Figure 3:
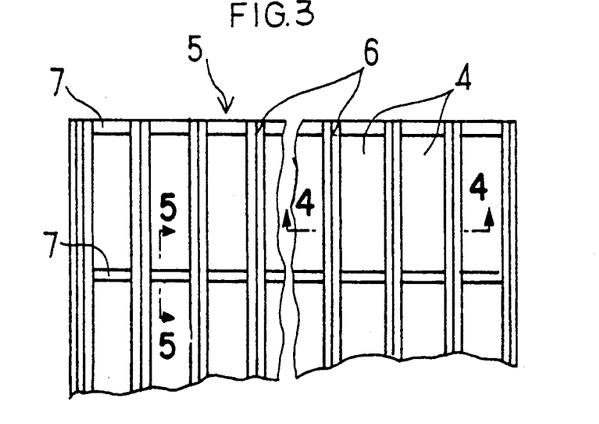
FIG. 3 is a plan view of a deflection-suppressing member in a splash attenuator according to the present invention.
Figure 4:
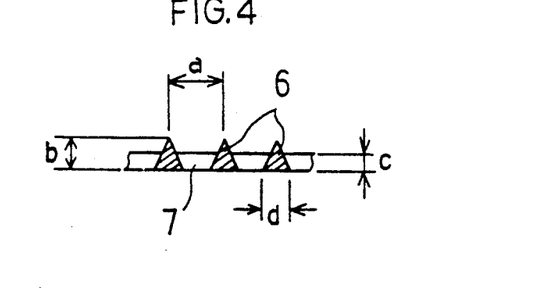
FIG. 4 is a sectional view taken along the line 4—4 of FIG. 3.
Figure 5:
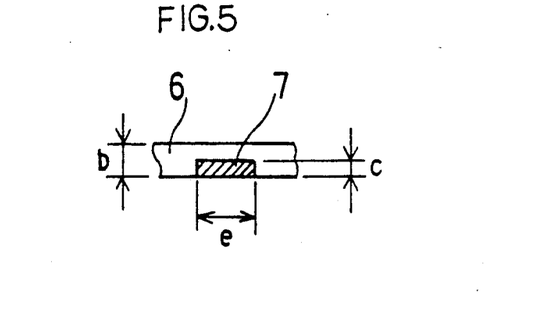
FIG. 5 is a sectional view taken along the line 5—5 in FIG. 3.

FIG. 3 shows a first embodiment of the present invention. In a tire housing 1 (see FIG. 6), a deflection-suppressing member 5 is provided which has a plurality of apertures 4 formed facing a tire 2 and through which muddy water or the like 3 flung from the tire 2 is passed. The deflection-suppressing member 5 suppresses the deflection of the muddy water which has impinged upon the tire housing 1. More particularly, the deflection-suppressing member 5 is made of a plurality of vertical strands 6 disposed and spaced a predetermined distance from each other which are connected to each other by means of horizontal strands 7, the apertures 4 being defined by these vertical and horizontal strands 6 and 7. The strands 6 have a triangular cross-section as shown in FIG. 4, and they are fitted in the strands 7 as shown in FIG. 5. The spacing a between the apexes of the strands 6 is approximately 6.7 mm, the strands 6 have a height b or about 3.7 mm, and the strands 7 are about 2 mm thick (c). The base width d of the triangular cross-section of the strands 6 is approximately 3.3 mm. The strands 7 are approximately 7 mm wide (e). The deflection-suppressing member 5 measures about 438.8 mm in width and about 942 mm in length. The deflection-suppressing member 5 is installed to the inner face of tire housing 1 in such a manner that the apex of the triangular cross-section of the strands 6 is directed toward the tire. The apertures 4 are elongated circumferentially of the tire 2 so that the water splashed from the tire is directed smoothly into the deflection-suppressing member 5. Desirably, the strands 7 of the deflection-suppressing member 5 are smaller in number or dimensions, but they should preferably be within a range of about 3 to 10 mm wide (e) and spaced about 80 to 120 mm from each other, in view of their durability. The strands 6 should preferably be of triangular cross-section having a vertical angle as acute as 90° or less, for full performance of their splash-attenuating function. Also, the horizontal strands 7 may be designed to have a triangular cross-section.

Figure 6:
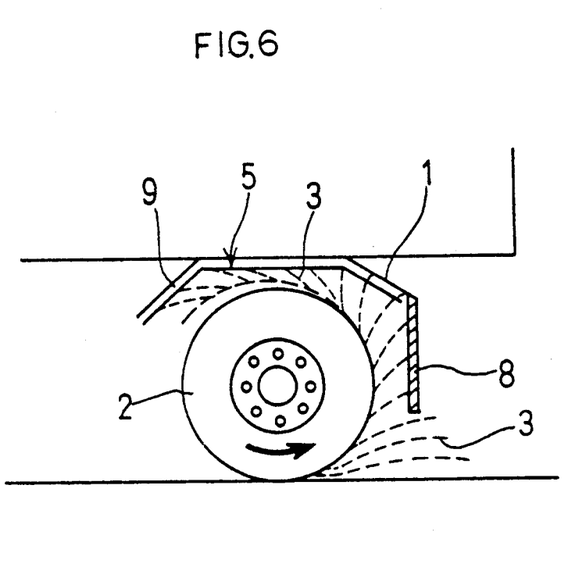
FIG. 6 is a simplified side elevation of the entire splash attenuator.

FIG. 6 shows the deflection-suppressing member 5 shown in FIG. 3 installed to the inner face of tire housing 1. Also, a mud guard 8 is installed behind the tire housing 1. The deflection-suppressing member 5 is installed at a space 9 with respect to the inner face of tire housing 1. The space 9 serves as an energy absorbing zone, and should be more than at least 15 mm.

Figure 7:
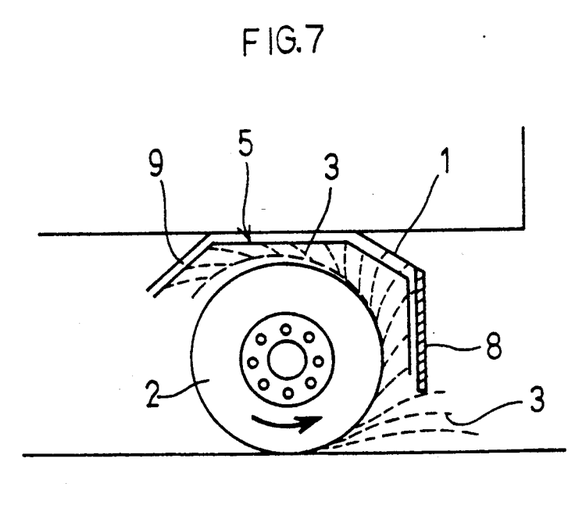
FIG. 7 is a simplified side elevation of another embodiment of the present invention.

FIG. 7 shows an embodiment in which the deflection-suppressing member 5 is provided with an extension along the inside of the mud guard 8.

Figure 8:
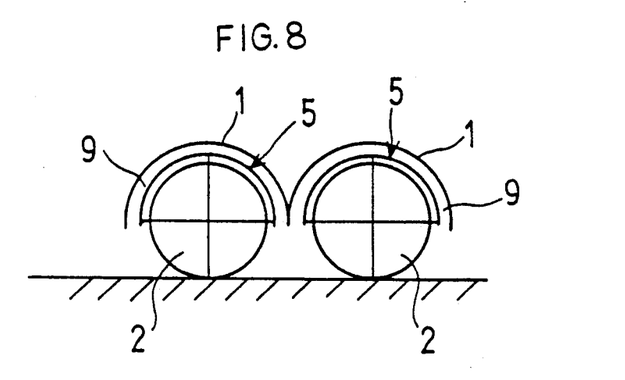
FIG. 8 is a simplified side elevation of yet another embodiment of the present invention.
Figure 9:
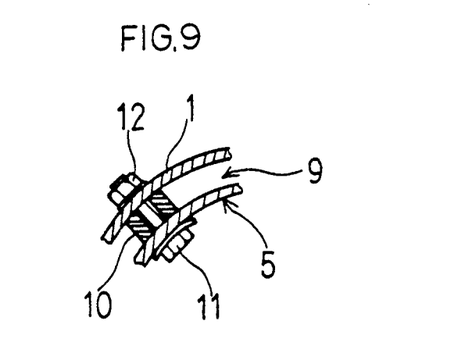
FIG. 9 is a sectional view showing an embodiment of a means for installing the deflection-suppressing member to a tire housing.

FIG. 8 shows the deflection-suppressing member 5 used in two tire housings 1 for tandem wheels, the tire housing 1 being different in shape from that shown in FIGS. 6 and 7. A deflection-suppressing member 5 is installed in each of the tire housings 1 with a space 9 defined between a member 5 and the inner face of each tire housing 1. To define the space 9, the deflection-suppressing member 5 is installed to the tire housing 1 with a spacer 10 placed between them, as shown in FIG. 9. The member 5, tire housing 1 and spacer 10 are fastened to one another with a bolt 11 and nut 12.

In the first embodiment, the vertical strands 6 project toward the tire 2. These strands 6 have a triangular cross-section whose apex is directed toward the tire 2 and whose bottom is directed toward the tire housing 1. The width of the strands 6 and 7 facing the tire 2, namely, the bottom length d of the vertical strands 6 and the width e of the horizontal strands 7, is within a range of 2 to 15 mm. If these dimensions d and e are less than 2 mm, the junction of the strands 6 and 7 will be weak and possibly broken. On the contrary, if the dimensions d and e are more than 15 mm, the impinging muddy water from the tire 2 will be significantly sprayed. In this case, the function of the splash attenuator is degraded. The ratio of the area all the apertures 4 occupy to the whole surface area of the deflection-suppressing member facing the tire, that is, the opening ratio, is within a range of 25 to 55%, and the diameter of the apertures 4 elongated circumferentially of the tire 2 is within a range of 30 to 150 mm. If the diameter of the apertures 4 exceeds 150 mm, the strands 6 and 7 will risonate from the vibration of the vehicle and quickly lose their ability to function. If the diameter is less than 30 mm, the splash attenuation function of the strands is degraded. If the opening ratio exceeds 55%, the deflection-suppressing member 5 will be weakened, and if it is less than 25%, the function of splash attenuation is degraded.

Figure 10:
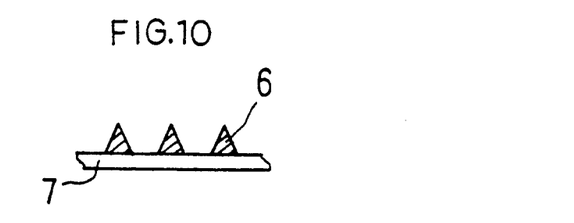
FIG. 10 is a similar sectional view to FIG. 4, showing another embodiment of the deflection-suppressing member.
Figure 11:
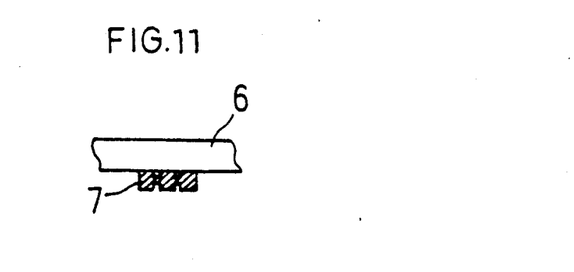
FIG. 11 is a similar sectional view to FIG. 5, of the embodiment shown in FIG. 10.

FIGS. 10 and 11 show an embodiment in which the shape of the horizontal strands 7 and their installation to the vertical strands 6 are different from those previously described. However, the strands 6 and 7 have similar cross-sectional shapes to those shown in FIGS. 4 and 5, and their basic basic arrangement is similar to that shown in FIGS. 3 to 5.

Figure 12:
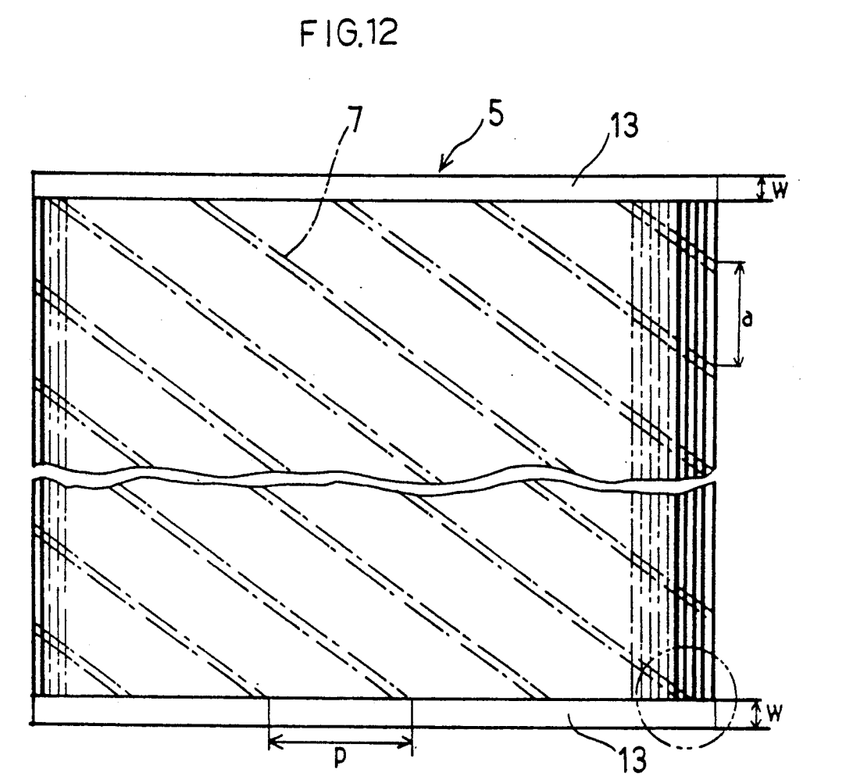
FIG. 12 is a sectional view of a further embodiment of the deflection-suppressing member.

FIG. 12 shows an embodiment in which the strands 7 in the deflection-suppressing member 5 are disposed diagonally and frame members 13 are provided at the top and bottom, respectively, of the member 5. The diagonal strands 7 are spaced at a pitch P about 120 mm from each other. The width W of the frame members 13 is on the order of 21 mm. The entire deflection-suppressing member 5 measures about 935 mm in length and 435 mm in width, and weighs about 600 to 850 g.

Figure 13:
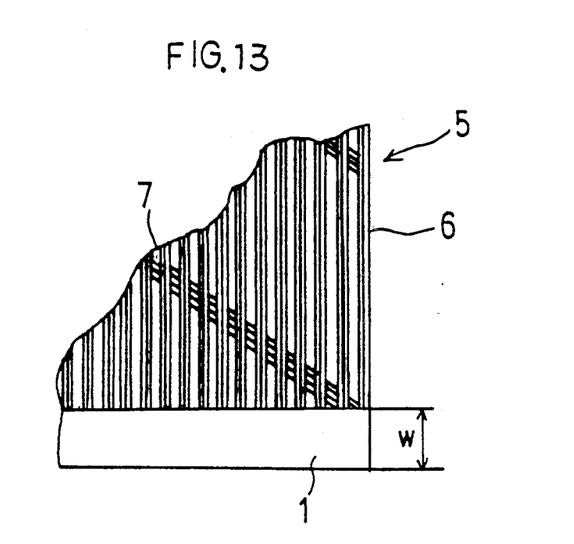
FIG. 13 is a drawing, enlarged in scale, of a corner portion encircled in FIG. 12.

FIG. 13 is a drawing, enlarged in scale, of the corner portion encircled with a double dot-dash line in FIG. 12.

Figure 14:
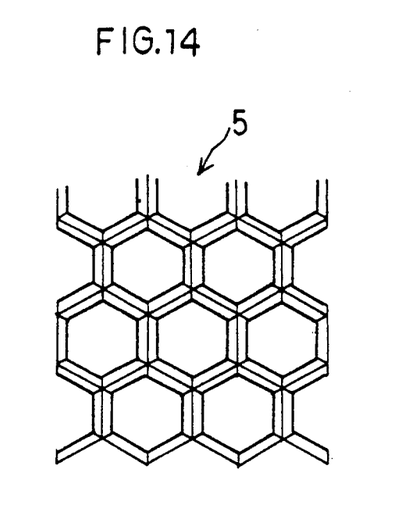
FIG. 14 is a sectional view of a deflection-suppressing member formed in the shape of a tortoise shell.
Figure 15:
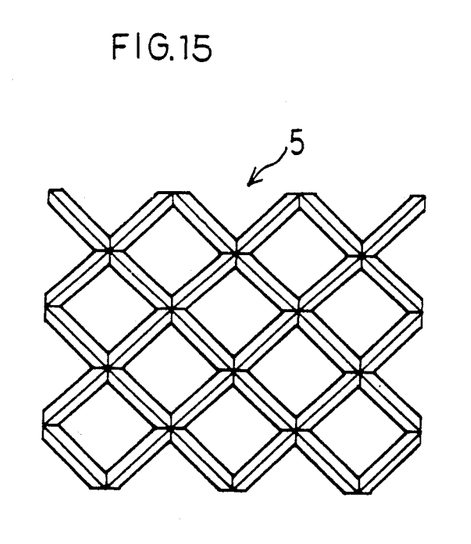
FIG. 15 is a sectional view of a deflection-suppressing member formed in the shape of a lattice.
Figure 16:
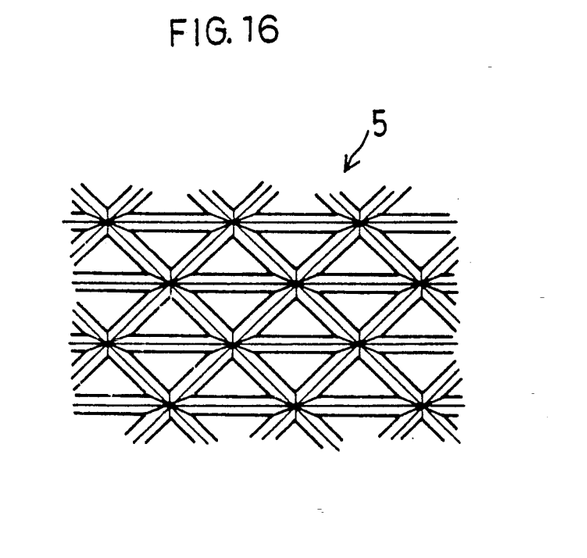
FIG. 16 is a plan view of an embodiment in which diagonal strands are provided in a deflection-suppressing member having the form of a lattice.

FIGS. 14 to 16 show three variations of the deflection-suppressing member 5. In these embodiments, the strands have a similar triangular cross sectional shape to that of the vertical strands 6 in previous embodiment.

Figure 17:
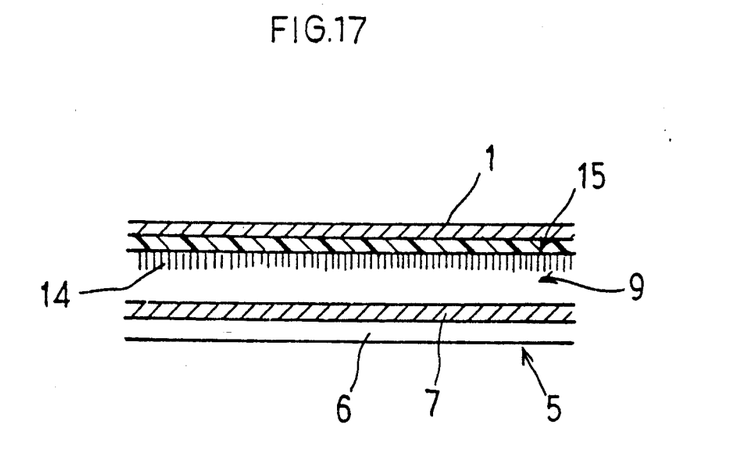
FIG. 17 is a sectional view of an embodiment in which a cushion layer is provided in a space between the a deflection-suppressing member and the inner face of a tire-housing.

FIG. 17 shows an embodiment in which the space 9 is not an air space but has provided therein a resin-made or rubber-made cushion layer 15, of the artificial lawn type, having thin resilient projections 14 (of 0.5 to 1.5 mm diameter) laid at a density of about 80%. This layer 15 absorbs more incident energy of muddy water passed through the apertures 4 in the deflection-suppressing member 5.

The deflection-suppressing member 5 should preferably be formed integrally from a plastic material such as polyethylene or the like to minimize its weight. For the mud guard 8, the invention disclosed in the specification and drawings of the European Patent Publication No. 0 425 852 A1 is suitable.

When the space 9 and deflection-suppressing member 5 are not provided in the tire housing 1, the splash rate is 72%. However, it is 49% when the tire housing 1 is provided with the space 9 and deflection-suppressing member 5. Further, when the cushion layer 15 is provided in the space 9, the splash rate is 25 to 35%.

What is claimed is:

1. A splash attenuator for a vehicle tire, consisting of a deflection-suppressing member disposed opposite an inner face of a tire housing at a distance greater than 15 mm, spacer means disposed between said deflection-suppressing member and the inner face, and fastening means interconnecting the tire housing, spacer means and deflection-suppressing member to form an air space between the inner face and said deflection-suppressing member, said deflection-suppressing member having a plurality of strands projecting towards said tire defining a plurality of apertures for transmitting water flung from said tire through said apertures and into said air space, said deflection-suppressing member having a total surface area facing said tire, said plurality of apertures having a combined surface area facing said tire ranging from 25 to 55% of said total surface area and a length of each aperture in a circumferential direction of the tire ranges from 30 to 150 mm, each strand having a width facing said tire ranging from 2 to 15 mm and at least some of said strands having a triangular cross-section with an apex directed towards said tire and a bottom directed towards said inner face, whereby said deflection-suppressing member suppresses deflection of water passing through said apertures into said air space and impinging on the inner face of the tire housing.

2. A splash attenuator as in claim 1, wherein said fastening means comprises a nut and a bolt.

3. A splash attenuator as in claim 1, wherein said plurality of strands of said deflection-suppressing member are integrally formed of plastic.

* * * * *